United States Patent [19]

Pirani

[11] 4,365,327
[45] Dec. 21, 1982

[54] METHOD OF AND MEANS FOR SPREAD-SPECTRUM TRANSMISSION

[75] Inventor: Giancarlo Pirani, Turin, Italy

[73] Assignee: Cselt, Centro Studi e Laboratori Telecomunicazioni S.p.A., Turin, Italy

[21] Appl. No.: 215,793

[22] Filed: Dec. 12, 1980

[30] Foreign Application Priority Data

Dec. 13, 1979 [IT] Italy ............................. 69390 A/79

[51] Int. Cl.³ ........................................... H04J 13/00
[52] U.S. Cl. ....................................... 370/18; 370/19
[58] Field of Search ................ 370/18, 19, 119; 375/1

[56] References Cited

U.S. PATENT DOCUMENTS 4,001,564 1/1977 Bied-Charreton et al. ........... 370/19
4,312,073 1/1982 de Niet et al. ....................... 370/18

OTHER PUBLICATIONS

"Spread Spectrum as a Multiplexing Technique", *Proceedings of the IREE*, vol. 34 No. 4, May 1973.

*Primary Examiner*—Gerald L. Brigance
*Attorney, Agent, or Firm*—Karl F. Ross

[57] ABSTRACT

An analog signal sent from one telephone subscriber to another is periodically sampled at a transmitting terminal and each sample is held for a storage period equal to a sampling interval as well as to a basic pulse period of a random or pseudorandom sequence of bipolar binary pulses. A stepped wave formed from these samples is mixed with that pulse sequence before being conveyed, e.g. by frequency modulation, to a receiving terminal where the wave so distorted is mixed with a like pulse sequence to re-establish the undistorted wave which may be contaminated by interferences from other users of the same signal link. The steps of the re-established wave are integrated over periods equal to the sampling interval and the integration products are stored for like periods to produce a purged stepped wave from which high-frequency components are subsequently filtered out to restore the original analog signal. The signal link utilized may be an emergency channel made available, e.g. for communication with a mobile station, when regular channels are busy.

9 Claims, 5 Drawing Figures

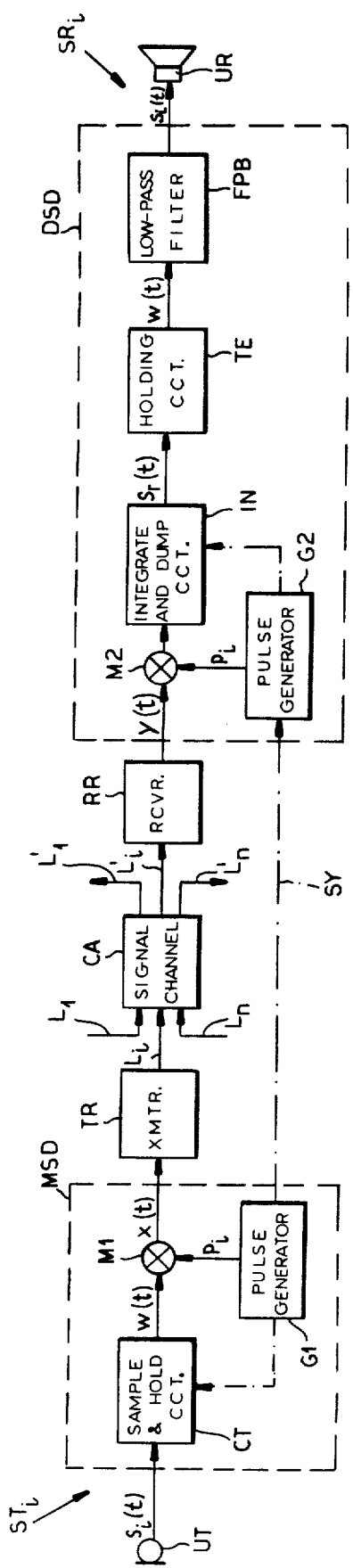
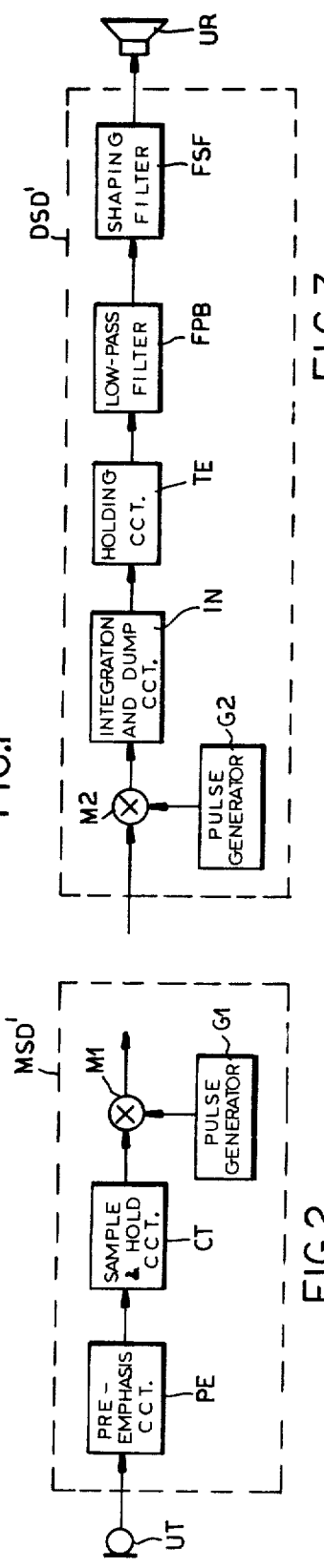
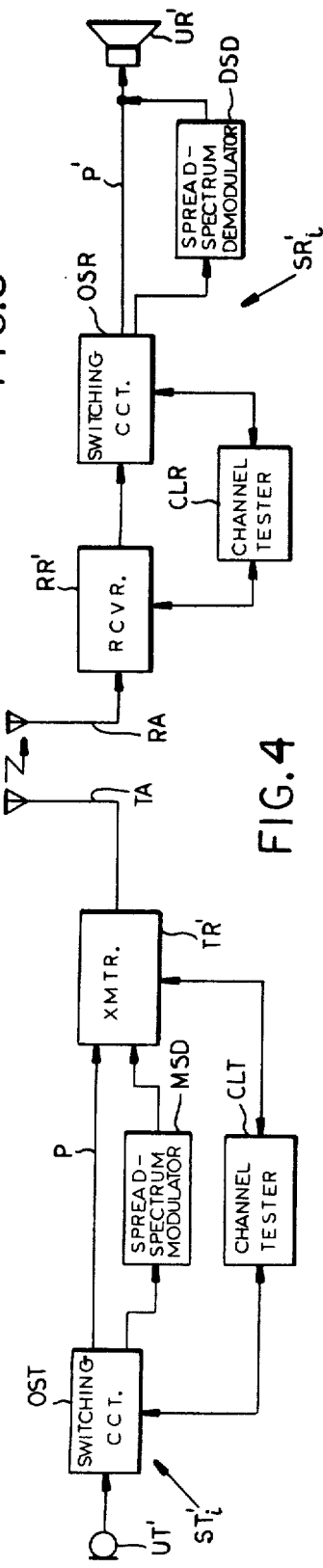
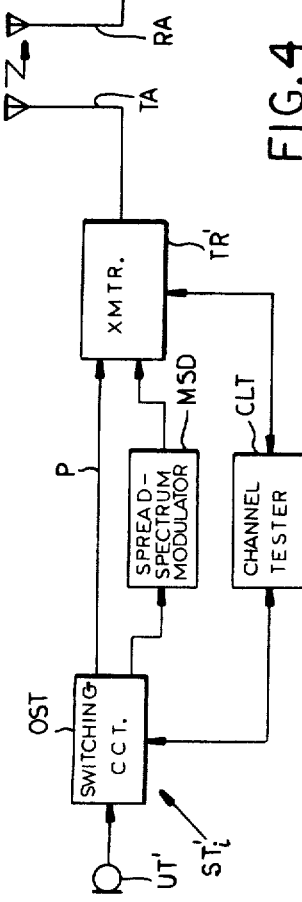

METHOD OF AND MEANS FOR SPREAD-SPECTRUM TRANSMISSION

FIELD OF THE INVENTION

My present invention relates to a method of and means for sending signals from a plurality of transmitting stations to respective receiving stations over a common channel, e.g. a radio link, forming part of a so-called spread-spectrum telecommunication system.

BACKGROUND OF THE INVENTION

Spread-spectrum modulation has long been used in the transmission of digital signals from different sources over a common channel, its purpose being to insure the privacy of the transmitted messages and to minimize mutual interference among simultaneously transmitted signals. At a transmitting station, outgoing digital signals (which could be analog signals converted into binary form) are multiplied with a random or pseudorandom sequence of binary pulses whose period is a submultiple of the symbol duration; the sequences generated at the transmitting stations are essentially uncorrelated among one another. Such sequences may conform, for example, to the well-known Walsh function. At an associated receiving station, the incoming digital signal distorted by the aforementioned pulse sequence—and possibly encumbered by interfering signals from other users of the same channel—is multiplied with a pulse sequence which is a precise replica of the one used at the transmitting end and is properly synchronized therewith. This procedure re-establishes the original binary signal which is then integrated over limited intervals, equaling the duration of the symbols, to eliminate accompanying interferences. The digital signal thus purged can be reconverted, if desired, into analog form.

Since digital signals require a considerable bandwith for their transmission, spread-spectrum modulation has heretofore been generally limited to military uses. Moreover, the analog/digital conversion at the transmitting end and the digital/analog reconversion at the receiving end are cumbersome procedures which limit the utility of such systems for civilian purposes, e.g. for intercommunication among telephone subscribers.

OBJECTS OF THE INVENTION

The general object of my present invention is to provide a method of and means for enabling the transmission of analog signals by the spread-spectrum technique without the need for intervening conversions into and from digital form.

A more particular object is to adapt the spread-spectrum technique for use with mobile stations carried, for example, aboard automotive vehicles.

SUMMARY OF THE INVENTION

I have found that the direct transmission of analog signals by the aforedescribed technique is possible if the outgoing signal is preprocessed before being multiplied with the binary pulse sequence individual to the station considered and if the incoming signal at the associated receiving station is subjected to an after treatment reconstituting the original analog signal by eliminating high-frequency components due to the preceding short-term integration, all with maintenance of the essentially analog character of the transmitted signal.

In accordance with my present invention, the preprocessing involves a sampling of the outgoing analog signal at intervals not exceeding the reciprocal of twice the bandwidth of that signal, with storage of the resulting samples for periods equaling the sampling intervals. This produces a stepped wave which is multiplied at the transmitting and receiving ends with identical and synchronized random or pseudorandom binary pulse sequences of bipolar character so that the first multiplication inverts the polarity of certain amplitude steps while the second multiplication restores that polarity; the two identical binary sequences have a basic pulse period which advantageously equals the length of the sampling intervals and storage periods referred to above but could also be a whole multiple thereof. At the associated receiving station, the integration (following the second multiplication) is performed over intervals also equaling the sampling intervals to provide discrete signals with amplitudes proportional to those of the steps of the re-established wave which, upon storage for periods again equal to these sampling intervals, yield a delayed counterpart of that wave substantially purged of interfering signals. The delayed wave has a low-frequency component conforming to the outgoing analog signal which can readily be isolated by low-pass filtering.

Thus, a system for the transmission of analog signals in accordance with my present invention comprises first and second arithmetic means at a transmitting station and at an associated receiving station connected to respective generators of synchronized binary pulse sequences for performing the two multiplication steps set forth above, together with circuitry including integrating means connected to the second arithmetic means for substantially reconstituting the outgoing signal. Pursuant to my present improvement, I further provide sample-and-hold means upstream of the first arithmetic means for periodically taking samples of an outgoing analog signal and holding the samples for uniform storage periods equaling the sampling intervals, thereby giving rise to a stepped wave undergoing distortion in the first arithmetic means; this distorted wave is reconverted by the second arithmetic means into the original stepped wave which may be encumbered by interfering signals to be suppressed upon subsequent integration. The aforementioned circuitry also includes holding means connected to the integrating means for receiving a series of discrete signals with amplitudes proportional to those of respective steps of the reconstituted original stepped wave, as discussed above, followed by filter means for extracting the low-frequency component of that wave conforming to the original analog signal.

BRIEF DESCRIPTION OF THE DRAWING

The above and other features of my invention will now be described in detail with reference to the accompanying drawing in which:

FIG. 1 is a block diagram of part of a telecommunication system embodying my invention;

FIGS. 2 and 3 show modifications of a spread-spectrum modulator and a spread-spectrum demodulator respectively included in a transmitting station and in a receiving station of the system of FIG. 1;

FIG. 4 is a block diagram similar to that of FIG. 1, showing an adaptation of the system for use with a mobile station.

SPECIFIC DESCRIPTION

Figure 5:
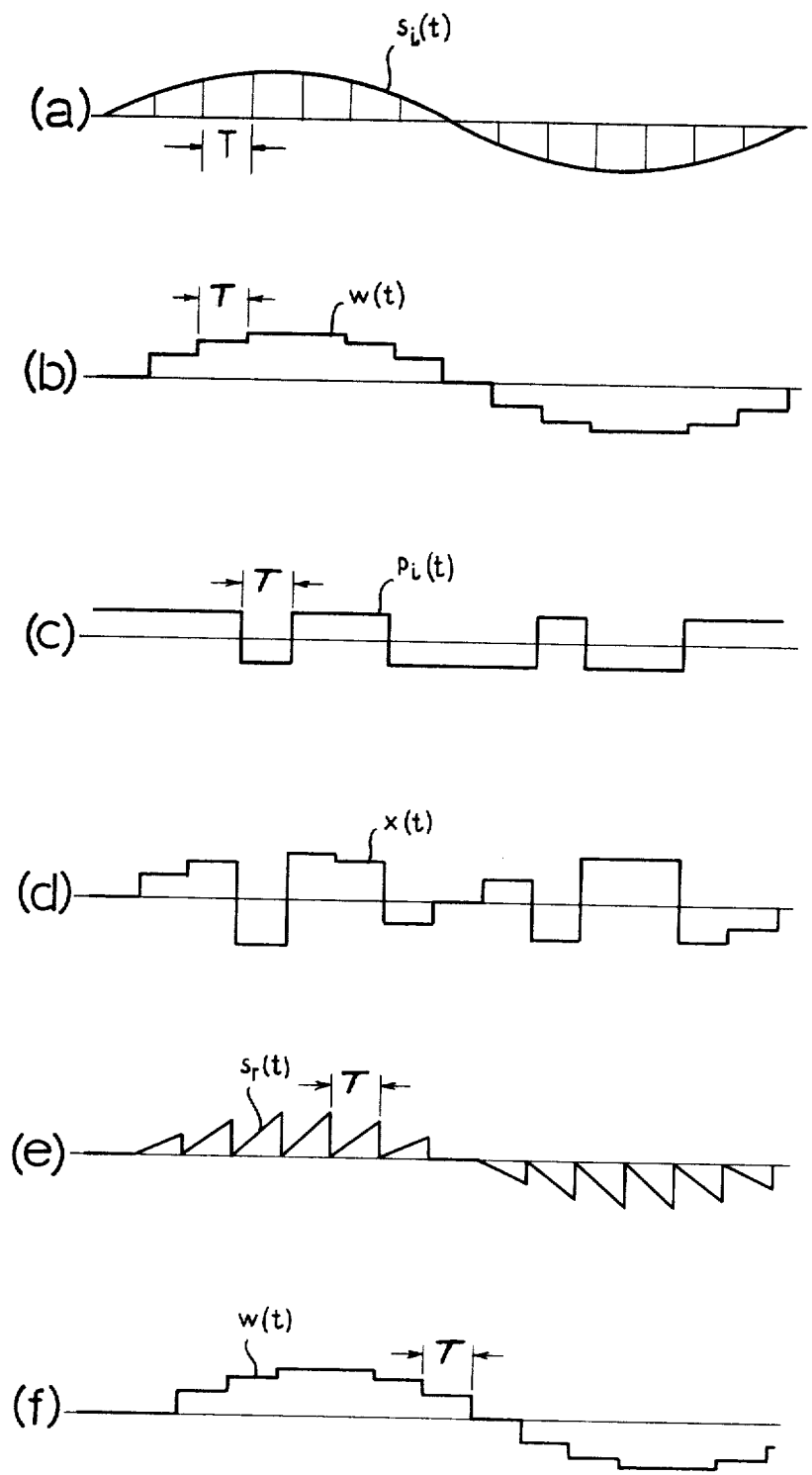
FIG. 5 is a set of graphs relating to the operation of the system of FIG. 1.

In FIG. 1 I have shown a transmitting station $ST_i$ communicating with a receiving station $SR_i$ via a common signal channel CA which could be a cable or a radio link. Station $ST_i$ is representative of a group of transmitting stations connected to the input end of channel CA via respective lines $L_l$–$L_m$; similar lines $l'_l$–$L'_m$ extend from the output end of that channel to a group of receiving stations of which station $SR_i$ is representative.

Transmitting station $ST_i$ serves a subscriber's telephone set UT symbolized by a microphone. A subscriber set served by receiving station $SR_i$ is symbolized by a speaker UR. The equipment shown in FIG. 1 and described hereinafter is designed only for one-way transmission from subscriber set UT to subscriber set UR; it will be understood, however, that similar equipment is to be provided for transmission in the reverse direction.

The equipment of station $ST_i$ consists essentially of a spread-spectrum modulator MSD working into a signal transmitter TR which is connected by a line $L_i$ to channel CA and which may operate, for example, by frequency modulation of a carrier. A signal receiver RR of station $SR_i$, complementing transmitter TR, recovers the baseband signal from the arriving carrier and feeds it to a spread-spectrum demodulator DSD. Modulator MSD comprises a sample-and-hold circuit CT connected to one input of a first multiplier M1 having another input connected to a pulse generator G1 which is synchronized with circuit CT and emits a random or pseudorandom binary pulse sequence alternating between a positive and a negative voltage of the same absolute magnitude. Such a pulse generator may include, for example, a shift register with a multimode feedback varying in a programmed manner. The readout rate could also be subject to a programmed variation as long as the basic pulse period is not greater than twice the reciprocal of the bandwidth of the outgoing signal, i.e. does not extend over more than a half-cycle of the highest voice frequency to be transmitted. Receiver RR is fed by a line $L'_i$.

Demodulator DSD comprises a second multiplier M2 having one input connected to receiver RR and another input connected to the output of a pulse generator G2 which is identical with pulse generator G1 and is synchronized therewith in a manner symbolized by a connection SY; such synchronization could be achieved, for instance, by a pilot frequency outside the voice band. Multiplier M2 works into an integration circuit IN synchronized with generators G1 and G2 so that its output voltage returns to zero at the end of each pulse period. Thus, circuit IN is of the integration-and-dump type as shown, for example, in commonly owned U.S. Pat. No. 4,201,909. This integrator feeds a holding circuit TE, also synchronized with generators G1 and G2, from which a connection extends via a low-pass filter FPB to speaker UR.

The holding operation of circuit CT discriminates against the higher-frequency components of the outgoing voice signal by introducing an attenuation g(f) proportional to $(\pi fT/\sin\pi fT)^2$ where f is any constituent frequency of that signal and T is the holding period, or duration of a sampling interval, of circuit CT; this holding period is the same as that of circuit TE and also corresponds to the basic pulse period of generators G1 and G2. If that pulse period is variable as noted above, the two holding periods would have to be automatically readjusted through a suitable coupling.

The relative attenuation is particularly marked for signal components whose half-cycles have a length ½f not much greater than period T. I therefore prefer, especially in situations where period T exceeds one-third of the reciprocal of the bandwidth of the voice signal, to provide means for compensating this frequency-dependent attenuation either at the transmitting or at the receiving end. Thus, FIG. 2 shows a modified spread-spectrum modulator MSD' in which the sample-and-hold circuit CT is preceded by a pre-emphasis circuit PE having a gain proportional to attenuation g(f). Alternatively, as illustrated in FIG. 3, a modified spread-spectrum demodulator DSD' can be provided downstream of filter FPB (or possibly ahead of same) with a shaping filter FSF whose frequency characteristic is complementary to that of circuit CT.

In FIG. 4 I have shown a subscriber set UT' which may be carried aboard a vehicle together with a transmitting station $ST'_i$ whose signal transmitter TR' has an antenna TA for sending out radio-frequency carriers frequency-modulated by the outgoing signals. A signal receiver RR' of an associated receiving station $SR'_i$, serving a subscriber set UR', has an antenna RA for intercepting a transmitted carrier to be frequency-demodulated if that carrier is intended for station $SR'_i$, as determined by conventional coding. (Here, again, equipment needed for signal transmission in the opposite direction has not been illustrated.) The carriers which can be sent out via antenna TA and received by antenna RA constitute a plurality of signal channels including several normal channels (carrying only one message each) and one spread-spectrum channel adapted to be used simultaneously by several subscribers, some of which could also be served by simpler stations such as those shown in FIG. 1. Station $ST'_i$ differs from station $ST_i$ by the provision of a channel tester CLT controlling a switching circuit OST which alternatively connects subscriber set UT' to transmitter TR' via a direct path P or via spread-spectrum modulator MSD. Similarly, a switching circuit OSR controlled by a channel tester CLR in station $SR'_i$ alternatively connects receiver RR' to subscriber set UR' via a direct path P' or via spread-spectrum demodulator DSD. Thus, tester CLT determines whether transmitter TR' has access to an available normal channel, in which case the path P is used to modulate the voice signals from subscriber set UT' directly upon an outgoing carrier; if all normal channels are busy and the subscriber wishes to communicate with station $SR'_i$, e.g. because of an emergency situation, circuit OST in station $ST'_i$ switches the microphone UT' to modulator MSD whose output signal is then modulated by transmitter TR' upon a carrier reserved for spread-spectrum communication. Similarly, tester CLR in station $SR'_i$ identifies the channel on which incoming signals are received and causes these signals to be switched by circuit OSR to path P' for direct delivery to speaker UR' if a normal channel is being used; otherwise, the incoming baseband signal passes through demodulator DSD for restoration of the original analog signal. Modulator MSD or demodulator DSD could be replaced by circuitry MSD' (FIG. 2) or DSD' (FIG. 3), respectively.

I shall now describe, with reference to FIG. 5, the operation of modulator MSD and demodulator DSD in the system of FIG. 1 or FIG. 4.

Graph (a) of FIG. 5 shows an outgoing analog message signal $s_i(t)$, simply illustrated as a sine wave, emitted by the microphone UT (or UT') and sampled in circuit CT at intervals T. The resulting samples, designated $s_i(nT)$ hereinafter, are stored for respective periods T so as to give rise to a stepped wave w(t) as shown in graph (b). The pulse sequence $p_i(t)$ emitted by generator G1, shown in graph (c), has a basic pulse period T whose length is a fraction of a half-cycle of sine wave $s_i(t)$. The actual pulses of the sequence $p_i(t)$ extend each over one or more periods T and are either positive or negative, with a magnitude assigned the value ±1. When wave w(t) and sequence $p_i(t)$ are multiplied in device M1, with their pulse and storage periods T coinciding, a distorted wave x(t) as shown in graph (d) results. Depending on the nature of channel CA, the latter wave can be sent directly or by way of a carrier to demodulator DSD; such a carrier, of course, will always be required when the channel is a radio link as shown in FIG. 4. A signal y(t) appearing in the output of receiver RR (or RR') may differ from wave x(t) by accompanying interfering signals which have not been illustrated. These interferences are substantially suppressed by integrator IN whose output signal $s_i(t)$, shown in graph (e), is a succession of sawtooth pulses of width T and of a slope proportional to the amplitude of the purged output signal of multiplier M2 in the corresponding pulse period. The peak of each sawtooth, reached at the end of a pulse period generically designated nT, constitutes a discrete signal $s_i(nT)$ which is also proportional to the amplitude of that output original and is preserved in holding circuit TE for a further period T whereby the stepped wave w(t) of graph (b) is reconstituted, with a phase lag equal to T, as shown in graph (f). A low-frequency component of the output signal of circuit TE conforms, upon being extracted by filter FPB, to the original message signal $s_i(t)$.

Signal y(t) fed at an instant ± to multiplier M2, with $nT < t < (n+1)T$, is given by the following equation:

$$y(t) = s_i(nT)p_i(t) + \sum_{j \neq i} a_j s_j(nT) p_j(t) \tag{1}$$

where $a_j$ represents the amplitude and $s_j(nT)$ represents the shape of a signal, coinciding with a step $s_i(nT)$ of wave w(t), concurrently sent over the common channel CA from any other transmitting station to a respective receiving station; symbol $p_j(t)$ designates the associated pulse sequence. Another term of equation (1), omitted for the sake of simplicity, represents the contribution of thermal noise.

An integrated sample $s_i(nT)$ of signal $s_i(t)$ in the output of circuit IN, appearing during a pulse period nT, is given by:

$$s_i(nT) = \int_{nT}^{(n+1)T} s_i(nT) p_i^2(t) dt + \tag{2}$$

$$\sum_{j \neq i} \int_{nT}^{(n+1)T} a_j s_j(nT) p_j(t) p_i(t) dt$$

The factor $p_i^2$ in the first integral will always have unity value while the integrals of the second term will average out to substantially zero. Thus, equation (2) can be rewritten in the form:

$$s_i(nT) \approx \int_{nT}^{(n+1)T} s_i(nT) dt \approx T \cdot s_i(nT) \tag{3}$$

Apart from the time factor T and other amplitude changes to which the incoming signal is subjected during processing, each step of the delayed wave shown in graph (f) of FIG. 5 will therefore rather faithfully conform to a respective message sample $s_i(nT)$.

Structurally, the components lying between sample-and-hold circuit CT and holding circuit TE in the system of FIG. 1 correspond to those of conventional spread-spectrum systems.

The structure of FIG. 4 is identical with that disclosed in my copending application Ser. No. 215,794 of even date relating to a somewhat different method of and device for the transmission of analog signals by the spread-spectrum technique.

I claim:

1. A method of sending signals from a plurality of transmitting stations to respective receiving stations over a common channel, comprising the steps of:
   (a) periodically sampling an outgoing analog signal at a given transmitting station, at intervals not exceeding the reciprocal of twice the bandwidth of said outgoing signal, and storing the resulting samples for periods equaling said intervals to produce a stepped wave;
   (b) multiplying said stepped wave at the given transmitting station with a sequence of bipolar binary pulses individual thereto and essentially uncorrelated with pulse sequences employed at other transmitting stations using said common channel, thereby producing a distorted wave;
   (c) conveying said distorted wave via said signal link to the associated receiving station;
   (d) multiplying the incoming distorted wave at the associated receiving station with a synchronized replica of said individual sequence to re-establish the wave of step (b) possibly encumbered by interfering signals from other users of said common channel;
   (e) integrating the re-established stepped wave over intervals equaling the sampling intervals of step (a) to provide discrete signal with amplitudes proportional to those of the steps of the re-established wave;
   (f) storing said discrete signals for periods equaling said sampling intervals to produce a delayed counterpart of the re-established stepped wave substantially purged of interfering signals and with a low-frequency component conforming to said outgoing analog signal; and
   (g) isolating said low-frequency component.

2. A method as defined in claim 1 wherein said individual sequence has a basic pulse period equaling said sampling intervals.

3. A method as defined in claim 1 or 2, comprising the further step of subjecting said outgoing analog signal, before sampling, to a frequency-dependent amplitude modification substantially compensating for an attenuation proportional to $(\pi fT/\sin\pi fT)^2$ undergone by said outgoing signal in step (a), f being any constituent frequency of said outgoing signal and T being the duration of a sampling interval.

4. A method as defined in claim 1 or 2, comprising the further step of subjecting said low-frequency component to a frequency-dependent amplitude modification substantially compensating for an attenuation proportional to $(\pi fT/\sin\pi fT)^2$ undergone by said outgoing signal in step (a), f being any constituent frequency of said outgoing signal and T being the duration of a sampling interval.

5. In a telecommunication system wherein a plurality of transmitting stations and a plurality of receiving stations are provided with a common channel for the conveyance of analog signals from a given transmitting station to an associated receiving station, each transmitting station comprising a first generator of an individual sequence of binary pulses essentially uncorrelated with pulse sequences emitted by corresponding generators of all other transmitting stations, each transmitting station further comprising first arithmetic means for multiplying an outgoing signal with said individual sequence, each receiving station comprising a second generator synchronized with said first generator of the associated transmitting station for emitting a replica of said individual sequence, each receiving station further comprising second arithmetic means for multiplying an incoming signal with said replica and circuitry including integrating means connected to said second arithmetic means for substantially reconstituting said outgoing signal, the improvement wherein at least one of said transmitting stations and an associated receiving station further comprise:

sample-and-hold means upstream of said first arithmetic means for periodically taking samples of an outgoing analog signal and holding said samples for uniform storage periods equaling the sampling intervals, thereby giving rise to a stepped wave undergoing distortion in said first arithmetic means, the distorted wave being reconverted by said second arithmetic means into the original stepped wave possibly encumbered by interfering signals from other transmitting stations using said common channel, said interfering signals being substantially suppressed by said integrating means operating with integration periods equal to said sampling intervals;

holding means in said circuitry connected to said integrating means for receiving therefrom a series of discrete signals with amplitudes proportional to those of respective steps of the reconstituted original stepped wave and preserving said discrete signals for periods equaling said sampling intervals, thereby producing a delayed counterpart of the reconstituted wave substantially purged of interfering signals; and filter means connected to said holding means for extracting from said delayed counterpart a low-frequency component conforming to said outgoing analog signal.

6. A system as defined in claim 5 wherein said one of said transmitting stations further comprises frequency-selective amplitude-modifying means upstream of said sample-and-hold means having an amplitude/frequency characteristic substantially compensating for an attenuation proportional to $(\pi fT/\sin\pi fT)^2$ undergone by said outgoing signal in said sample-and-hold means, f being any constituent frequency of said outgoing signal and T being the duration of a sampling interval.

7. A system as defined in claim 5 wherein the receiving station associated with said one of said transmitting stations further comprises frequency-selective amplitude-modifying means in series with said filter means having an amplitude/frequency characteristic substantially compensating for an attenuation proportional to $(\pi fT/\sin\pi fT)^2$ undergone by said outgoing signal in said sample-and-hold means, f being any constituent frequency of said outgoing signal and T being the duration of a sampling interval.

8. A system as defined in claims 5, 6 or 7 wherein said one of said transmitting stations comprises a first terminal provided with frequency-modulating means for sending out signals over any one of several radio-frequency channels including a plurality of normal channels besides said common channel, the latter constituting said common signal link, first test means connected to said first terminal for ascertaining the availability of any normal channel, and first switchover means controlled by said first test means for connecting a source of outgoing analog signals to said first terminal directly in the presence of a free normal channel for signal transmission thereover and via said sample-and-hold means and said first arithmetic means in the absence of a free normal channel for signal transmission over said common channel; the receiving station associated with said one of said transmitting stations comprising a second terminal provided with frequency-demodulating means for obtaining incoming signals from any of said radio-frequency channels, second test means connected to said second terminal for identifying a channel over which incoming signals are being received, and second switchover means controlled by said second test means for connecting said second terminal to a load directly upon arrival of incoming signals over any normal channel and via said second arithmetic means, said circuitry and said filter means upon arrival thereof over said common channel.

9. A system as defined in claim 8 wherein said one of said transmitting stations is carried aboard a vehicle.

* * * * *